March 15, 1960     E. H. MUMFORD     2,928,214
COOLING SYSTEM FOR GLASS FORMING MOLDS Filed Sept. 15, 1958     2 Sheets-Sheet 1

INVENTOR
EUSTACE H. MUMFORD

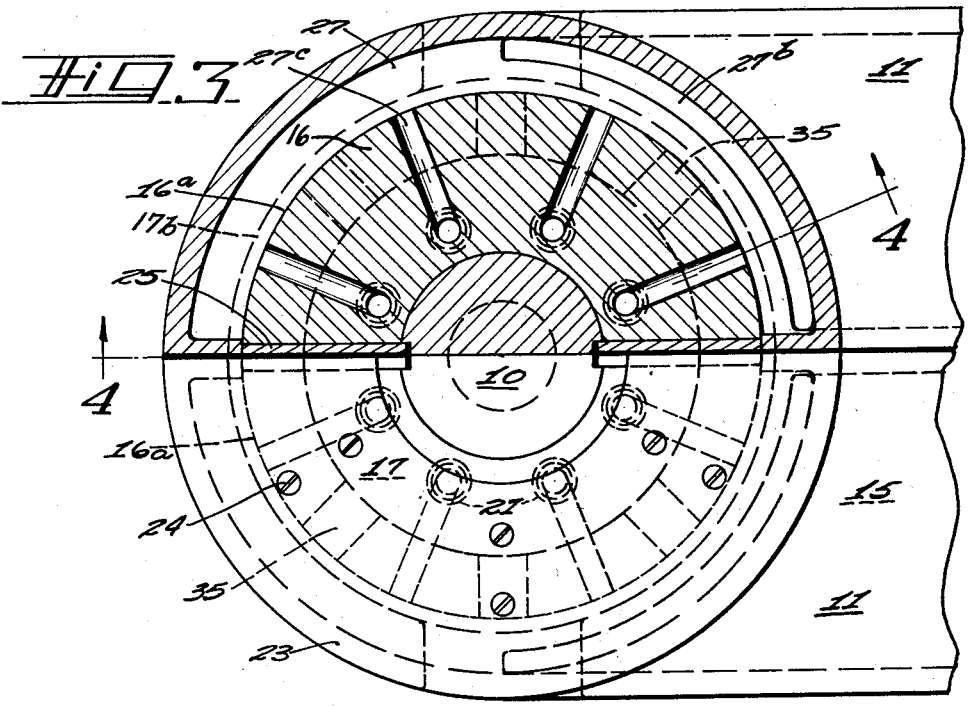
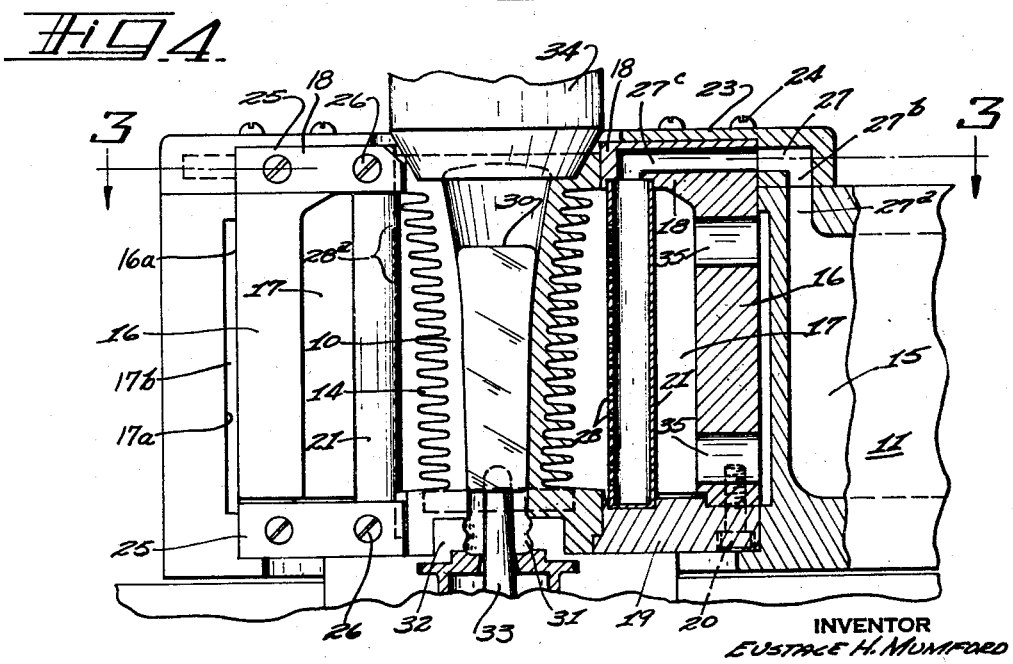

2,928,214

COOLING SYSTEM FOR GLASS FORMING MOLDS

Eustace H. Mumford, Ottawa Lake, Mich., assignor to Owens-Illinois Glass Company, a corporation of Ohio Application September 15, 1958, Serial No. 761,259

3 Claims. (Cl. 49—40)

My invention relates to molds for molding glass articles and particularly to a heat exchange system for zonal cooling or regulating the temperature of the molds. The invention in its preferred form herein illustrated is embodied in a molding apparatus comprising a split mold for molding charges of molten glass to form blanks or parisons. The invention provides a novel form of zonal cooling means for applying cooling air to the mold and distributing the air for zonal cooling or in a particular pattern, with a view to obtaining a uniform or desired distribution of the glass when blown in a finishing mold. The present invention provides a novel construction in which the mold arms carrying the two halves or sections of a split mold are formed with air chambers, channels and air distributing means for directing and distributing cooling air applied to the mold.

This present application is a continuation-in-part of my copending application, Serial No. 553,252, filed December 15, 1955, now abandoned.

Referring to the accompanying drawings:

Fig. 3 is a part sectional plan view of the mold, the section being at the line 3—3 on Fig. 4; and Fig. 4 is a sectional elevation at the line 4—4 on Fig. 3.

Figure 1:
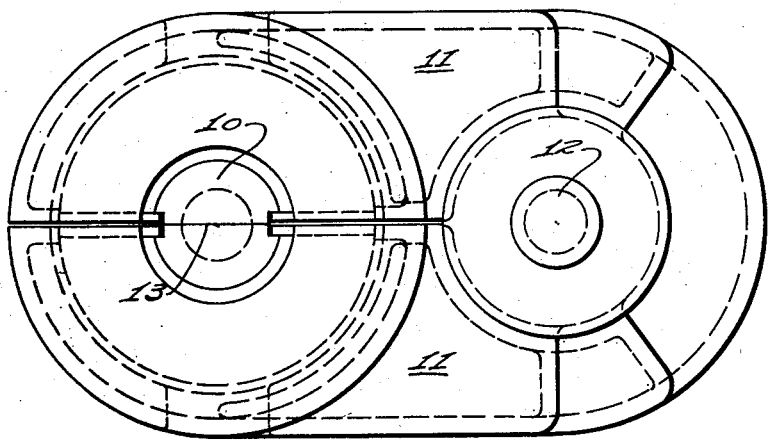
Fig. 1 is a plan view of a split mold and its carrying arms.

As shown in Fig. 1, the blank mold 10 comprises partible sections mounted in mold carrying arms 11 which are pivoted to swing about the axis of a pivot pin 12 for opening and closing the mold. The meeting faces 13 of the two mold sections are brought together in a vertical plane. The mold sections may be of the usual or well known split form and as shown in Fig. 4 are provided on their external surface areas with cooling ribs 14. The mold arms 11 are arranged for opening and closing movement in the usual manner.

Figure 2:
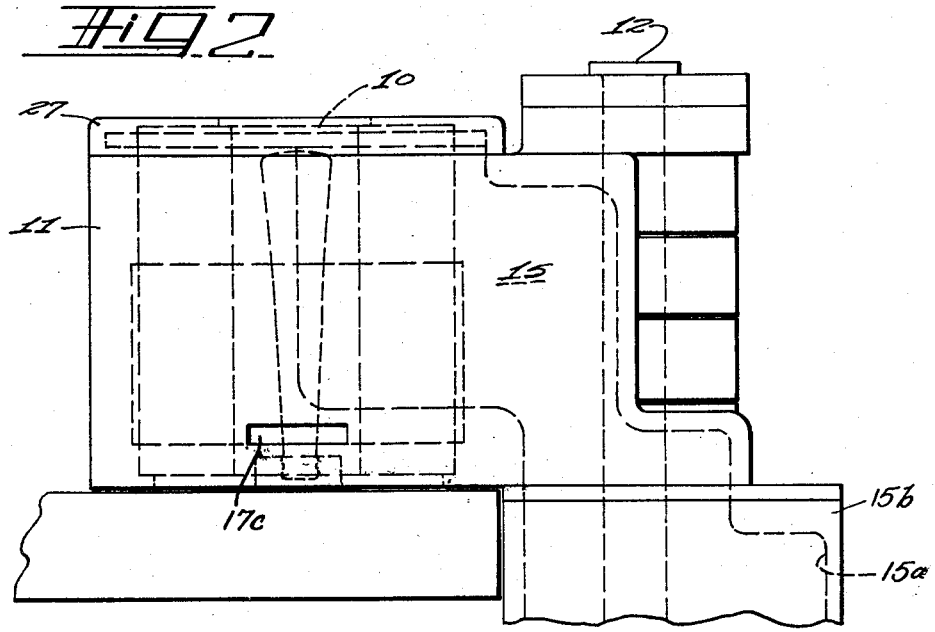
Fig. 2 is a side elevational view of the same.

The mold carrying arms 11 are of hollow form providing pressure chambers 15 which serve as channels through which air or other cooling fluid under pressure is transmitted continuously through channel 15$^a$ in column 15$^b$ and from a source of high pressure of any well known type (not shown). Mounted in the free end of each arm 11 is a section of a cage 16 substantially in the form of a hollow half cylinder concentric with the mold and defining the outer wall of an inner air chamber or exhaust chamber 17. The outer cylindrical wall surface 16$^a$ of the cage 16 is of somewhat smaller diameter than the wall surface 17$^a$ of the air chamber 17, thereby providing in the outer end of each mold arm 11 a narrow space forming a passageway 17$^b$ between the concentric surface 16$^a$ and 17$^b$. The upper end portion 18 of the cage is extended inwardly to fit around the upper end portion of the mold 10 and forms an upper wall for the chamber 17. A plate 19, attached by bolts 20 to the lower end of the cage, provides a bottom wall or floor for the chamber 17. Vertical plates 25 are attached to each end of the cage sections 16 by screws 26 and serve as retainers for the mold halves 10 but do not come into physical contact with each other. Thus the pressure air may also exhaust to a limited degree through the small opening 25$^a$ which will exist between the mold arms when in closed position (Figures 1 and 2).

Mounted within each section of the cage 16 are blowing devices or nozzles 21 in the form of vertical pipes or tubes extending through the chamber 17, the blowing devices being arranged in an annular series surrounding the mold, with the tubes spaced at equal intervals. Cover plates 23 are attached by screws 24 to the cage 16. The nozzles 21 are in communication with the chambers 15 through semicircular chambers or channels 27 formed in the plates 23. The chambers 15 open through ports 27$^a$ and arc-shaped openings or ports 27$^b$ in the floors of the plates 23 into the channels 27. Radial openings 27$^c$ extend from the channels 27 through the wall portions 18 to the nozzles 21.

Each of the nozzles 21 is formed with a multiplicity of vertically arranged jet openings 28 extending through the portion of the wall of the nozzle facing the mold and arranged for impinging jets of cooling air against the mold. The area of each jet opening 28 may vary with respect to other openings in the same nozzle and at different areas lengthwise of the nozzle and also the vertical spacing of said openings may be similarly varied in order to obtain a desired zonal or pattern cooling effect. Thus, as shown in a zone 28$^a$ the openings 28 are narrowly spaced to increase the chilling effect. Such zonal cooling serves to control the cooling and chilling of the glass in a manner to obtain the desired distribution of the glass when blown in the finishing mold. This distribution of the cooling air will depend in part on the size, shape and desired wall thickness of the finished article. The nozzles 21 ordinarily will be changed for each different form of article which is to be blown by removing plate 23, lifting cage 16 and changing the several nozzles 21.

In operation a mold charge or gob 30 of molten glass is introduced into the parison mold 10 and pressed therein, thereby molding a neck portion 31 and parison within a neck ring or mold 32 and parison mold 10. The neck pin 33 extending upwardly through the neck ring is then withdrawn, the parison transferred to a blow mold and the glass blown within the blow mold to finished form. A head 34 closes the upper end of the inverted mold and provides a mold bottom for the parison while the latter is being blown in the blank mold 10. Cooling air under high pressure is continuously supplied through the mold arms 11 to the pressure chambers 15 and channels 27 to the nozzles 21 and directed against the fins 14 of mold halves 10, thereby providing a condition through which the heat is extracted from the parison mold walls in predetermined pattern. The amount of cooling varies at different vertically spaced surface areas of the parison corresponding to the pattern of the jet openings 28 provided in the nozzles 21. The air is exhausted from the chambers 17 through openings 35 in the walls of the cages 16 into and through the passageways 17$^b$ which are open for exhaust to the outside air through passages 17$^c$ formed in the outer surfaces of the arms 11.

Modifications may be resorted to within the spirit and scope of my invention as defined in the appended claims.

I claim:

1. In a glass forming device the combination of a split mold, movable mold arms supporting each half of said split mold and individual to each said half, each said mold arm formed to provide a pressure chamber individual to and extending circumferentially around each mold half, a channel for conveying a high pressure coolant to said pressure chamber, means providing an inner exhaust chamber interposed between each said mold half and said pressure chamber, said means comprising a wall extending circumferentially of the mold half and spaced therefrom, nozzles mounted within the said exhaust chamber, means providing channels through which air under pressure is continuously conducted from said pressure chamber to said nozzles, each said nozzle being formed with a series of vertically juxtaposed openings arranged to continuously direct jets of air against each mold half and exhaust openings leading from each said exhaust chamber.

2. In a glass forming device the combination of a split mold, movable mold arms supporting each half of said split mold and individual to each said half, each said mold arm formed to provide a pressure chamber individual to and extending circumferentially around each mold half, a channel for conveying a high pressure coolant to said pressure chamber, means providing an inner exhaust chamber interposed between each said mold half and said pressure chamber, said means comprising a wall extending circumferentially of the mold half and spaced therefrom, a series of nozzles mounted within the said exhaust chamber, means providing channels through which air under pressure is continuously conducted from said pressure chamber to the nozzles, each said nozzle being formed with a series of vertically juxtaposed openings arranged to continuously direct jets of air against each mold half in a vertically arranged pattern and exhaust openings from said exhaust chamber.

3. In a glass forming device the combination of a split mold, movable mold arms supporting each half of said split mold and individual to each said half, each said mold arm formed to provide a pressure chamber individual to and extending circumferentially around each mold half, a channel for conveying a high pressure coolant to said pressure chamber, means providing an inner exhaust chamber interposed between each said mold half and said pressure chamber, said means comprising a wall extending circumferentially of the mold half and spaced therefrom, a series of interchangeable nozzles mounted within the said exhaust chamber, means providing channels through which air under pressure is continuously conducted from said pressure chamber to the nozzles, each said nozzle being formed with a series of vertically juxtaposed openings arranged to continuously direct jets of air against each mold half in a vertically arranged pattern and exhaust openings from said exhaust chamber.

References Cited in the file of this patent

UNITED STATES PATENTS

| | | |
|---|---|---|
| 1,057,198 | Winder | Mar. 25, 1913 |
| 1,531,415 | Said | Mar. 31, 1925 |
| 1,632,992 | Bragg | June 21, 1927 |
| 1,685,546 | Lee | Sept. 25, 1928 |
| 2,269,060 | Mitford | Jan. 6, 1942 |
| 2,485,836 | MacConnel | Oct. 25, 1949 |